United States Patent
Nakamura et al.

(10) Patent No.: US 10,303,152 B2
(45) Date of Patent: May 28, 2019

(54) MOTOR CONTROLLER

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: Fanuc Corporation, Osaka (JP)

( * ) Notice: Subject to any disclaimer, the term of this patent is extended or adjusted under 35 U.S.C. 154(b) by 0 days.

(21) Appl. No.: 16/006,006

(22) Filed: Jun. 12, 2018

(65) Prior Publication Data

US 2018/0373221 A1    Dec. 27, 2018

(30) Foreign Application Priority Data

Jun. 21, 2017 (JP) .................. 2017-121341

(51) Int. Cl.
*G05B 5/01* (2006.01)
*G05B 19/23* (2006.01)

(52) U.S. Cl.
CPC .. *G05B 19/237* (2013.01); *G05B 2219/41118* (2013.01); *G05B 2219/41166* (2013.01); *G05B 2219/41426* (2013.01); *G05B 2219/41437* (2013.01); *G05B 2219/42065* (2013.01)

(58) Field of Classification Search
CPC ........ G05B 19/237; G05B 2219/41118; G05B 2219/42065; G05B 2219/41437; G05B 2219/41426; G05B 2219/41166
USPC ....................................................... 318/611
See application file for complete search history.

(56) References Cited

U.S. PATENT DOCUMENTS

| 6,590,358 | B1* | 7/2003 | Tsutsui | ..................... G05B 5/01 |
| | | | | 318/560 |
| 2008/0180052 | A1* | 7/2008 | Iwashita | ................ G05B 19/19 |
| | | | | 318/615 |
| 2009/0009128 | A1* | 1/2009 | Okita | ................... G05B 13/024 |
| | | | | 318/619 |

(Continued)

FOREIGN PATENT DOCUMENTS

| JP | 2009-42985 | 2/2009 |
| JP | 2009-237916 | 10/2009 |

(Continued)

*Primary Examiner* — Eduardo Colon Santana
*Assistant Examiner* — Gabriel Agared
(74) *Attorney, Agent, or Firm* — Wenderoth, Lind & Ponack, L.L.P.

(57) ABSTRACT

A motor controller which controls a servo motor for driving a machine, includes: a speed command unit which commands the speed of the machine; a speed detection unit which detects the speed of the servo motor; and a speed control unit which produces a torque command based on a speed command and a motor speed detected so as to control the speed of the servo motor, where the speed control unit includes a filter which approximates the inverse characteristic of a transmission characteristic from the servo motor to the machine, the filter has a transmission characteristic F(s) based on a frequency $\omega$, a vibration damping coefficient $\zeta$ and a cutoff frequency $\omega_{adj}$ which are adjustment parameters and the frequency $\omega$ is adjusted so as to be equal to or more than an antiresonant frequency $\omega_0$ of the machine but less than a resonant frequency $\omega_p$.

4 Claims, 4 Drawing Sheets

(56) References Cited

U.S. PATENT DOCUMENTS

| | | | |
|---|---|---|---|
| 2011/0307093 A1* | 12/2011 | Tsai | G05B 19/4062 |
| | | | 700/177 |
| 2014/0009100 A1* | 1/2014 | Sera | G05B 5/01 |
| | | | 318/611 |
| 2015/0268658 A1* | 9/2015 | Sonoda | G05B 19/19 |
| | | | 318/570 |
| 2016/0070252 A1* | 3/2016 | Imada | H02P 29/00 |
| | | | 318/561 |
| 2016/0209829 A1* | 7/2016 | Nakamura | G05B 19/404 |
| 2016/0359435 A1* | 12/2016 | Yoshiura | H02P 23/18 |
| 2018/0129190 A1* | 5/2018 | Hoshino | H02P 29/40 |

FOREIGN PATENT DOCUMENTS

| | | |
|---|---|---|
| JP | 2016-16397 | 2/2016 |
| JP | 6017595 | 10/2016 |
| JP | 6046182 | 11/2016 |
| WO | 02/082194 | 10/2002 |

\* cited by examiner

MOTOR CONTROLLER

This application is based on and claims the benefit of priority from Japanese Patent application No. 2017-121341, filed on Jun. 21, 2017, the content of which is incorporated herein by reference.

BACKGROUND OF THE INVENTION

Field of the Invention

The present invention relates to a motor controller which controls a servo motor.

Related Art

For example, in a machine tool, a motor controller known which controls a servo motor so as to drive a feed axis. When in the machine tool described above, the servo motor and a machine are coupled with the feed axis such as a ball screw, the rigidity of the feed axis is low such that e servo motor and the machine are brought into a state of spring coupling. Due to the spring coupling, in the feed axis of the machine, low-frequency resonance (vibration) in a servo control band may occur.

As a method of reducing the low-frequency resonance (vibration) described above, a method of correcting a position command, a method of using a filter for a servo position control loop and the like are examined. Patent Documents 1 and 2 disclose a motor drive device in which in a motor controller for performing position control based on a position command to drive a feed axis in a machine tool, a filter is used for a servo position control loop.

Patent Document 1: Japanese Patent No. 6017595
Patent Document 2: Japanese Patent No. 6046182

SUMMARY OF THE INVENTION

In a motor controller for driving a spindle (drive unit) in a machine tool or in a motor controller for driving a hydraulic pump, a belt conveyor (drive unit) or the like in an industrial machine, without position control based on a position command being performed, speed control based on a speed command may be performed. In control on a feed axis (drive unit) in a machine tool, position control and speed control on one motor may be performed with separate motor controllers. The motor controller for performing such speed control itself is required to reduce low-frequency vibrations in the drive unit of a machine.

Although Patent Documents 1 and 2 disclose a method of reducing vibrations in the motor controller for performing the position control, they do not disclose a method of reducing vibrations in a motor controller for performing speed control.

An object of the present invention is to provide a motor controller which performs speed control based on a speed command and which reduces vibrations in the drive unit of a machine.

(1) A motor controller (for example, a motor controller 1 which will be described later) according to the present invention which controls a servo motor (for example, a servo motor 50 which will be described later) for driving a machine (for example, a machine 60 which will be described later (including a ball screw 70)), includes: a speed command unit for example, a speed command unit 10 which will be described later) which issues a speed command for commanding the speed of the machine; a speed detection unit (for example, an encoder 40 which will be described later) which detects the speed of the servo motor; and a speed control unit (for example, a speed control unit 20 which will be described later) which produces a torque command based on the speed command issued by the speed command unit and a motor speed detected the speed detection unit so as to control the speed of the servo motor, where the speed control unit includes a filter (for example, a filter 31 or 32 which will be described later) which approximates the inverse characteristic of a transmission characteristic from the servo motor to the machine, the filter has a transmission characteristic $F(s)$ of formula (1) below based on a frequency $\omega$, a vibration damping coefficient and a cutoff frequency $\omega_{adj}$ which are adjustment parameters and the frequency $\omega$ is adjusted so as to be equal to or more than an antiresonant frequency $\omega_0$ of the machine but less than a resonant frequency $\omega_p$ of the machine.

[Formula 1]

$$F(s) = \frac{s^2 + 2\varsigma\omega s + \omega^2}{s^2 + \sqrt{2}\,\omega_{adj} s + \omega_{adj}^2} \tag{1}$$

(2) Preferably, in the motor controller according to (1), the speed control unit includes: a feedforward control unit (for example, a FF control unit 21) which produces a first torque command based on the speed command; a feedback control unit (for example, a FB control unit 23 which will be described later) which produces a second torque command based on a difference between the speed command and the motor speed; and an addition unit (for example, an adder 26 which will be described later) which adds together the first torque command and the second torque command so as to produce the torque command, and the feedforward control unit and the feedback control unit include the filters for which the transmission characteristic $F(s)$ can be set individually and independently.

(3) Preferably, in the motor controller according to (2), the feedforward control unit includes the filter which approximates the inverse characteristic of a transmission characteristic from the torque command to a speed of the machine, and the feedback control unit includes the filter which approximates the inverse characteristic of a transmission characteristic from the motor speed to the speed of the machine.

(4) Preferably, in the motor controller according to (2) or (3), the frequency $\omega$ in the transmission characteristic $F(s)$ of the filter in the feedforward control unit can be adjusted in a range equal to or more than the frequency $\omega$ in the transmission characteristic $F(s)$ of the filter in the feedback control unit.

According to the present invention, it is possible to provide a motor controller which performs speed control based on a speed command and which reduces vibrations in the drive unit of a machine.

DETAILED DESCRIPTION OF THE INVENTION

An example of an embodiment of the present invention will be described below with reference to accompanying drawings. In the drawings, the same or corresponding portions are identified with the same reference numerals.

Figure 1:
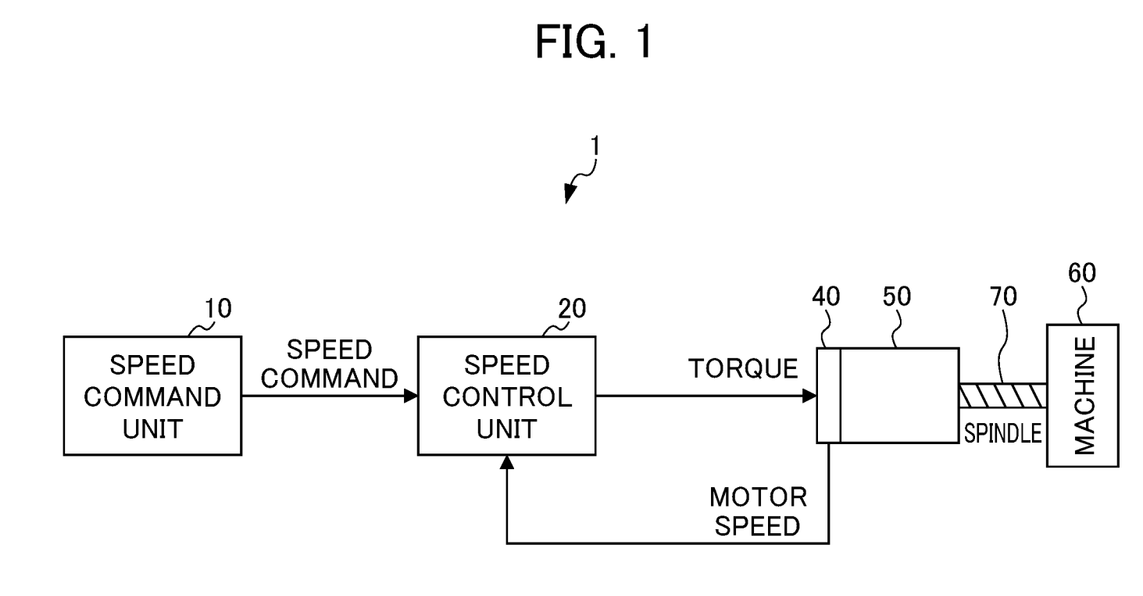
FIG. 1 is a schematic view of the configuration of a motor controller according to the present embodiment.
Figure 2:
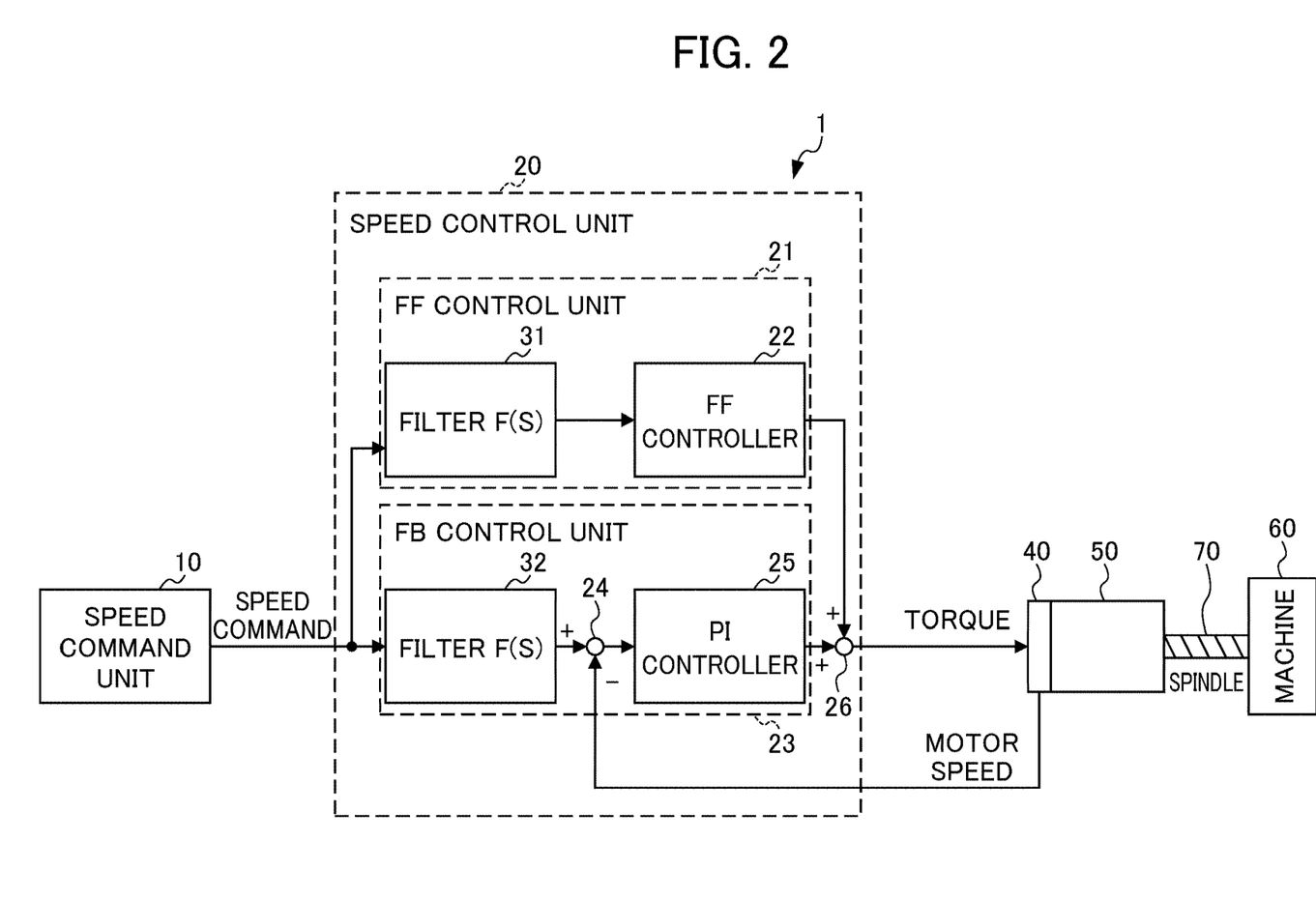
FIG. 2 is a diagram showing in detail the configuration of the motor controller according to the present embodiment.

FIG. 1 is a schematic view of the configuration of a motor controller according to the present embodiment, and FIG. 2 is a diagram showing in detail the configuration of the motor controller according to the present embodiment. The motor controller 1 shown in FIGS. 1 and 2 controls the speed of a servo motor 50 based on a speed command value corresponding to a machining program and an actual motor speed value (speed feedback value). The servo motor 50 is coupled to a ball screw 70 in a machine 60. The servo motor 50 rotates and drives the ball screw (drive unit) 70 so as to drive the machine 60. The motor controller 1 includes a speed command unit 10, a speed control unit 20 and an encoder (speed detection unit) 40.

The speed command unit 10 produces the speed command value for the servo motor 50 (that is, the speed command value for the machine 60) according to a program and a command input from a higher controller, an external input device or the like which is unillustrated.

The encoder 40 is provided in the servo motor 50 so as to detect the rotation speed of the servo motor 50. The detected motor speed is utilized as a speed feedback.

The speed control unit 20 produces a torque command value based on the speed command value produced in the speed command unit 10 and a motor speed value detected in the encoder 40. The speed control unit 20 includes a feedforward control unit (hereinafter referred to as a FF control unit) 21, a feedback control unit (hereinafter referred to as a FB control unit) 23 and an adder 26.

The FF control unit 21 produces a first torque command value based on the speed command value produced in the speed command unit 10. The FF control unit 21 includes a FF controller 22 and a filter 31.

The FF controller 22 differentiates the speed command value which is produced in the speed command unit 10 and which is then passed through the filter 31, and thereby produces the first torque command value.

The filter 31 is provided in the step preceding the FF controller 22. The filter 31 has the transmission characteristic F(s) of a formula (1) below based on a frequency $\omega$, a vibration damping coefficient $\zeta$ and a cutoff frequency $\omega_{adj}$ which are adjustment parameters.

[Formula 2]

$$F(s) = \frac{s^2 + 2\zeta\omega s + \omega^2}{s^2 + \sqrt{2}\,\omega_{adj}s + \omega_{adj}^2} \quad (1)$$

The frequency $\omega$ is adjusted in a range equal to or more than the antiresonant frequency $\omega_0$ of the machine 60 (the ball screw 70) but less than the resonant frequency $\omega_p$ thereof, and is preferably set near the resonant frequency $\omega_p$. In this way, as will be described later, the transmission characteristic F(s) of the filter 31 approximates the inverse characteristic of the transmission characteristic based on a two-inertia system model from the servo motor 50 to the machine 60 (the ball screw 70), more specifically, the inverse characteristic of the transmission characteristic from a torque command to a machine speed.

The FB control unit 23 produces a second torque command value based on a difference between the speed command value produced in the speed command unit 10 and the motor speed value detected in the encoder 40. The FB control unit 23 includes a subtractor 24, a proportional-integral controller (hereinafter referred to as a PI controller) 25 and filter 32.

The subtractor 24 determines the difference between the speed command value produced in the speed command unit 10 and passed through the filter 32 and the motor speed value detected in the encoder 40. The PI controller 25 performs PI control on the difference determined in the subtractor 24 so as to produce the second torque command value.

The filter 32 is provided in the step preceding the subtractor 24. As with the filter 31, the filter 32 has the transmission characteristic F(s) of formula (1) above. The frequency $\omega$ is adjusted in the range equal to or more than the antiresonant frequency $\omega_0$ of the machine 60 (the ball screw 70) but less than the resonant frequency $\omega_p$ thereof, and is preferably set near the antiresonant frequency $\omega_0$. In this way, as will be described later, the transmission characteristic F(s) of the filter 32 approximates the inverse characteristic of the transmission characteristic based on the two-inertia system model from the servo motor 50 to the machine 60 (the ball screw 70), more specifically, the inverse characteristic of the transmission characteristic from the motor speed to the machine speed.

For the filter 31 of the FF control unit 21 and the filter 32 of the FB control unit 23, the transmission characteristic F(s) can be set individually and independently. The frequency $\omega$ in the transmission characteristic F(s) of the filter 31 in the FF control unit 21 can be adjusted in a range equal to or more than the frequency $\omega$ in the transmission characteristic F(s) of the filter 32 in the FB control unit 23.

The adder 26 adds together the first torque command value from the FF control unit 21 and the second torque command value from the FB control unit 23.

Here, the rigidity of the ball screw 70 in the machine 60 is low such that the servo motor 50 and the machine 60 are brought into a state of spring coupling. Due to the spring coupling, in the ball screw 70 of the machine 60, low-frequency resonance (vibration) in a servo control band may occur.

In order to reduce the low-frequency resonance (vibration) in the ball screw 70 of the machine 60, the motor controller 1 of the present embodiment is characterized to include the filters 31 and 32 which have the transmission characteristic F(s) of formula (1) above that approximates the inverse characteristic of the transmission characteristic from the servo motor 50 to the machine 60 (the ball screw 70). A method of determining the transmission characteristic F(s) of the filters 31 and 32 will be described below.

Figure 3:
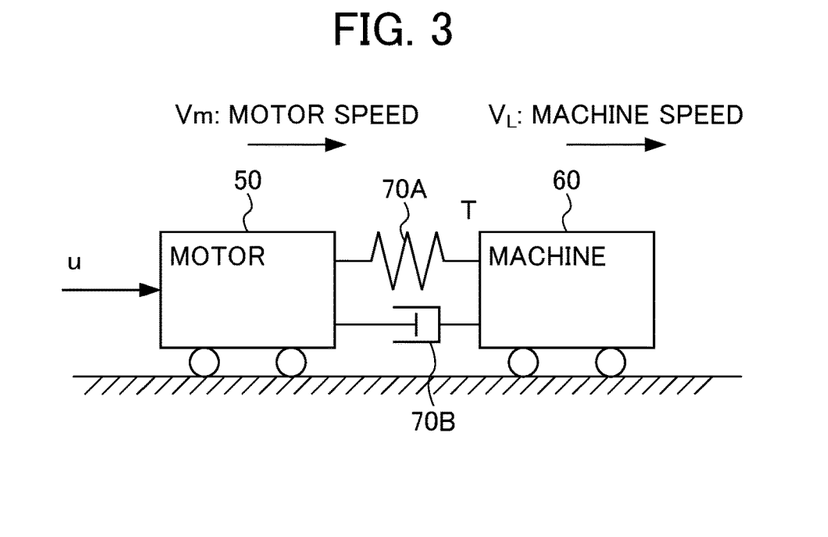
FIG. 3 is a diagram showing a configuration from a motor to a machine as a model of a two-inertia system model.
Figure 4:
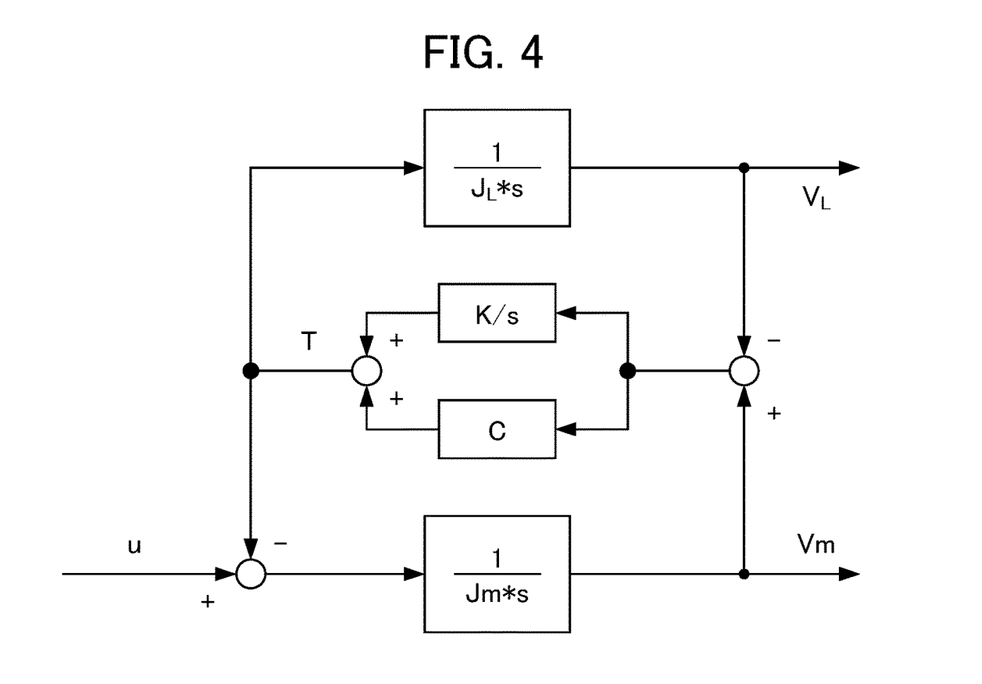
FIG. 4 is a block diagram of the two-inertia system shown in FIG. 3.

FIG. 3 is a diagram showing the two-inertia system model from the servo motor 50 to the machine 60 (the ball screw 70), and FIG. 4 is a block diagram of the two-inertia system model shown in FIG. 3. In the two-inertia system model shown in FIG. 3, the servo motor 50 and the machine 60 are mass points, and are coupled with a spring 70A and a dumper 70B corresponding to the ball screw 70. In FIG. 3, friction is ignored. Here, it is assumed that the masses of the servo motor 50 and the machine 60 are respectively $J_m$ and $J_L$, that the spring constant of the spring 70A is K, that the dumper constant of the dumper 70B is C, that the drive torque (torque command) of the servo motor 50 is u, that the resultant force of the spring 70A and the dumper 70B is that the motor speed is $V_m$ and that the machine speed is $V_L$, the motion equations of $V_m$ and $V_L$ and the resultant force T of the spring 70A and the dumper 70B are represented by formulas below.

[Formula 3]

$$V_m = \frac{1}{J_m s}(u - T)$$

$$V_L = \frac{1}{J_L s} T$$

$$T = \left(\frac{K}{s} + C\right)(V_m - V_L)$$

In this way, the model shown in FIG. 3 is represented by the block diagram shown in FIG. 4. The motion equations of $V_m$ and $V_L$ and the formula of the resultant force T of the spring 70A and the dumper 70B are modified, and thus the transmission characteristic from the torque (torque command) u to the motor speed $V_m$ and the transmission characteristic from the torque (torque command) u to the machine speed $V_L$ are respectively determined by formulas below. Torque→motor speed (transmission characteristic):

[Formula 4]

$$\frac{V_m}{u} = \frac{1}{s}\frac{J_L s^2 + Cs + K}{J_m J_L s^2 + (J_m + J_L)Cs + (J_m + J_L)K} = \frac{1}{J_m s}\frac{s^2 + 2\varsigma\omega_0 s + \omega_0^2}{s^2 + 2\varsigma'\omega_p s + \omega_p^2} \quad (2)$$

Torque→machine speed (transmission characteristic):

[Formula 5]

$$\frac{V_L}{u} = \frac{1}{s}\frac{Cs + K}{J_m J_L s^2 + (J_m + J_L)Cs + (J_m + J_L)K} = \frac{1}{J_m s}\frac{2\varsigma\omega_0 s + \omega_0^2}{s^2 + 2\varsigma'\omega_p s + \omega_p^2} \quad (3)$$

In formulas (2) and (3) above, forms which are converted into a secondary standard system are simultaneously represented. Here, $\omega_p$ and $\varsigma'$ are a resonant frequency and a vibration damping coefficient when the servo motor 50 is fixed in the two-inertia system model, and $\omega_0$ and $\varsigma$ are an antiresonant frequency and a vibration damping coefficient thereof. The antiresonant frequency $\omega_0$ and the resonant frequency $\omega_p$ are represented by formulas below.

[Formula 6]

$$\omega_0 = \sqrt{\frac{K}{J_L}} \quad (4)$$

$$\omega_p = \sqrt{\left(1 + \frac{J_L}{J_m}\right)\frac{K}{J_L}} \quad (5)$$

By formulas (2) and (3) above, the transmission characteristic from the motor speed $V_m$ to the machine speed $V_L$ is represented by formula below. Motor speed→machine speed (transmission characteristic):

[Formula 7]

$$\frac{V_L}{V_m} = \frac{2\varsigma\omega_0 s + \omega_0^2}{s^2 + 2\varsigma\omega_0 s + \omega_0^2} \quad (6)$$

Figure 5:
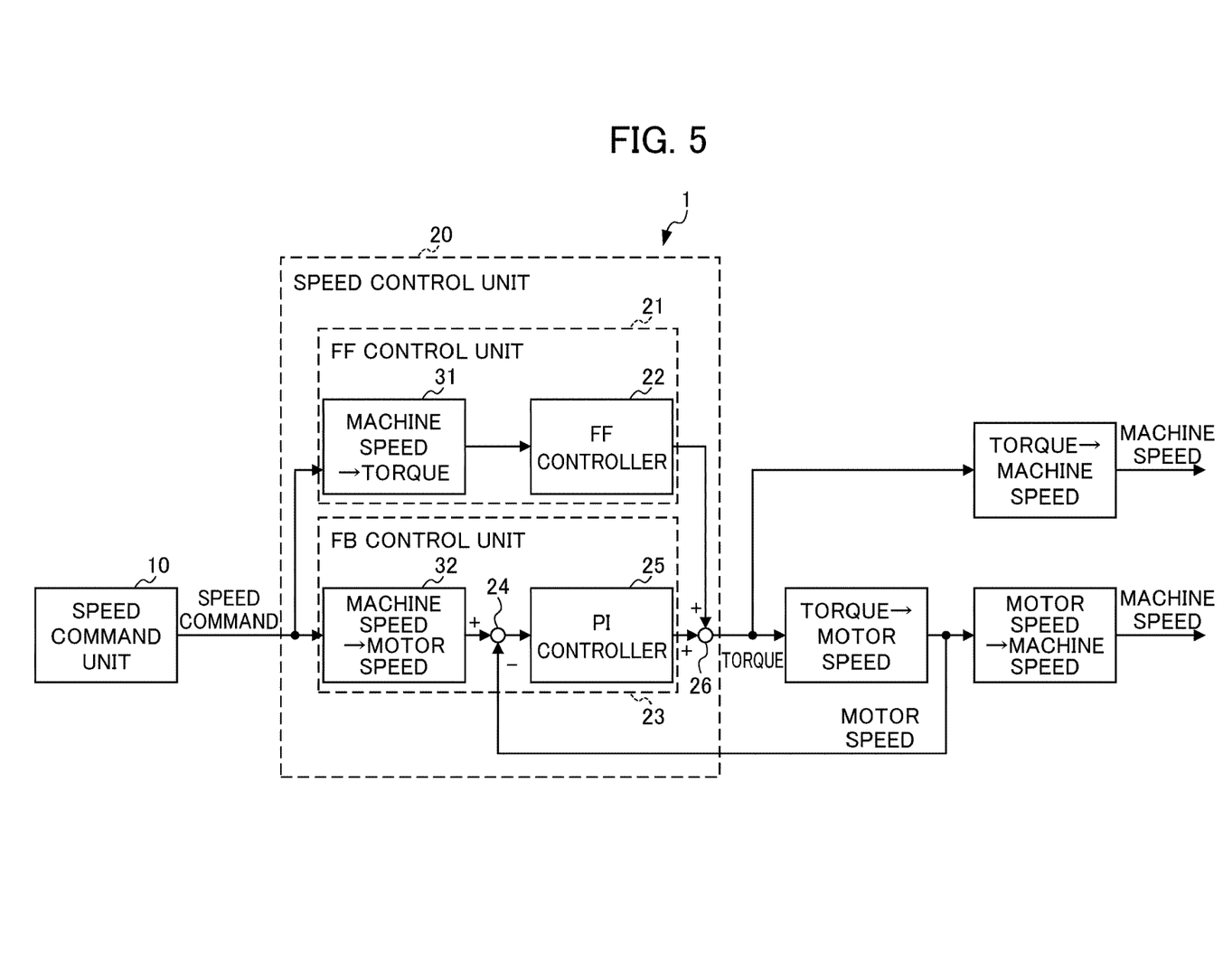
FIG. 5 is a schematic view showing, as transmission characteristics, part of the motor controller according to the present embodiment.

FIG. 5 is a diagram showing, as transmission characteristics, part of the motor controller according to the present embodiment. In FIG. 5, the configuration from the servo motor 50 to the machine 60 (the ball screw 70) shown in FIG. 2 is shown by the transmission characteristic from the torque (torque command) u to the motor speed $V_m$, the transmission characteristic from the torque (torque command) u to the machine speed $V_L$ and the transmission characteristic from the motor speed $V_m$ to the machine speed $V_L$ described above.

Here, the speed command issued by the speed command unit 10 is considered to be a command for the machine speed. This is a way of considering the reduction of vibrations in the machine 60 (the ball screw 70) regardless of whether or not vibrations are present from the speed command to the machine speed, that is, in the step preceding the machine 60 (the ball screw 70).

In order to consider that the speed command is a command for the machine speed, it is preferable to make the transmission characteristic from the speed command to the machine speed approach 1. Preferably, in order for the transmission characteristic from the speed command to the machine speed to be made the filter 31 of the FF control unit 21 has the inverse characteristic of the transmission characteristic from the torque (torque command) u to the machine speed $V_L$, that is, the transmission characteristic from the machine speed $V_L$ to the torque (torque command) u, and the filter 32 in the step preceding the subtractor 24 of the FB control unit 23 has the inverse characteristic of the transmission characteristic from the motor speed $V_m$ to the machine speed $V_L$, that is, the transmission characteristic from the machine speed $V_L$ to the motor speed $V_m$.

The transmission characteristic from the machine speed $V_L$ to the torque (torque command) u and the transmission characteristic from the machine speed $V_L$ to the motor speed $V_m$ are represented from formulas (3) and (6) above by formulas below. Machine speed→torque (transmission characteristic):

[Formula 8]

$$\frac{u}{V_L} = J_m s \frac{s^2 + 2\varsigma'\omega_p s + \omega_p^2}{2\varsigma\omega_0 s + \omega_0^2} \quad (7)$$

Machine speed→motor speed (transmission characteristic):

[Formula 9]

$$\frac{V_m}{V_L} = \frac{s^2 + 2\varsigma\omega_0 s + \omega_0^2}{2\varsigma\omega_0 s + \omega_0^2} \quad (8)$$

It is found from formulas (7) and (8) above that (1) denominator polynomials are common, (2) numerator polynomials are different in parameters for the frequencies $\omega_p$ and $\omega_0$ and the vibration damping coefficients $\zeta$ and $\zeta'$ but are the same in the form and
(3) the numerator polynomials include the secondary transmission characteristic of the frequency $\omega_p$ or the antiresonant frequency $\omega_0$. Hence, the sharing of the transmission characteristic (formula (7) above) of the filter 31 in the FF control unit 21 and the transmission characteristic (formula (8) above) of the filter 32 in the FB control unit 23 will be examined below.

The zero point and the pole of the secondary transmission characteristic of formulas (7) and (8) above are determined by formulas below. Machine speed→zero point of torque (transmission characteristic):

$$s = -\zeta\omega_p \pm j\sqrt{1-\zeta^2}\omega_p \quad \text{[Formula 10]}$$

Machine speed→zero point of motor speed (transmission characteristic):

$$s = -\zeta\omega_0 \pm j\sqrt{1-\zeta^2}\omega_0 \quad \text{[Formula 11]}$$

Pole (Common)

[Formula 12]

$$s = -\frac{\omega_0}{2\zeta}$$

In this way, the distances of the zero point and the pole from the complex plane origin are determined by formulas below. Machine speed→zero point of torque (transmission characteristic):

$$|s| = \omega_p \quad \text{[Formula 13]}$$

Machine speed→zero point of motor speed (transmission characteristic):

$$|s| = \omega_0 \quad \text{[Formula 14]}$$

Pole (Common):

[Formula 15]

$$|s| = \frac{\omega_0}{2\zeta} \quad (9)$$

Here, when it is assumed that as a general machine tool, a load inertia ratio $J_L/J_m$ is approximately 1 and that the vibration damping coefficient $\zeta$ is about 0.1, by formulas (4) and (5) above, the resonant frequency $\omega_p$ is about $\sqrt{2}$ times the antiresonant frequency $\omega_0$. It is found from formula (9) above that since the distance of the pole from the complex plane origin is separated 5 to 7.07 times ($5\sqrt{2}$ times) as much as the distance of the zero point from the complex plane origin, the zero point is dominant in the transmission characteristic.

In this way, as the common transmission characteristic F(s) of the filters 31 and 32, the transmission characteristic of formula (1) below including the dominant zero point is approximated.

[Formula 16]

$$F(s) = \frac{s^2 + 2\zeta\omega s + \omega^2}{s^2 + \sqrt{2}\,\omega_{adj}s + \omega_{adj}^2} \quad (1)$$

In formula (1) above, a denominator polynomial is made to have the format of a general secondary filter of the cutoff frequency $\omega_{adj}$. From the numerator polynomials of formulas (7) and (8) above, a numerator polynomial is made to have a format based on the frequency to and the vibration damping coefficient $\zeta$ serving as the adjustment parameters.

In formula (1) above, the frequency $\omega$ serving as the adjustment parameter is adjusted in the range equal to or more than the antiresonant frequency $\omega_0$ of the machine 60 (the ball screw 70) but less than the resonant frequency $\omega_p$ thereof. For example, in the transmission characteristic F(s) of the filter 31 in the FF control unit 21, by formula (7) above, the frequency $\omega$ is preferably set near the resonant frequency $\omega_p$, and the transmission characteristic F(s) of the filter 32 in the FB control unit 23, by formula (8) above, the frequency $\omega$ is preferably set to the antiresonant frequency $\omega_0$. As described previously, since as a general machine tool, the resonant frequency $\omega_p$ is about $\sqrt{2}$ times the antiresonant frequency $\omega_0$, the frequency $\omega$ in the transmission characteristic F(s) of the filter 31 in the FF control unit 21 is adjusted the range equal to or more than the frequency $\omega$ in the transmission characteristic F(s) of the filter 32 in the FB control unit 23.

As described above, in the motor controller 1 of the present embodiment which performs the speed control based on the speed command, the speed control unit 20 includes the filters 31 and 32 which approximate the inverse characteristic of the transmission characteristic from the servo motor 50 to the machine 60 (the ball screw 70), the filters 31 and 32 have the transmission characteristic F(s) of formula (1) above based on the frequency $\omega$, the vibration damping coefficient $\zeta$ and the cutoff frequency $\omega_{adj}$ which are the adjustment parameters and the frequency $\omega$ is adjusted so as to be equal to or more than the antiresonant frequency $\omega_0$ of the machine 60 (the ball screw 70) but less than the resonant frequency $\omega_p$. In this way, it is possible to make the transmission characteristic from the speed command to the machine speed approach 1, and thus the speed command can be considered to be a command for the machine speed. Hence, it is possible to reduce vibrations in the ball screw (drive unit) 70 of the machine 60.

Incidentally, according to formulas (7) and (8) above, the characteristic (the inverse characteristic of the transmission characteristic from the torque (torque command) to the machine speed) necessary for the filter 31 of the FF control unit 21 in the speed control unit 20 is different from the characteristic (the inverse characteristic of the transmission characteristic from the motor speed to the machine speed) necessary for the filter 32 of the FB control unit 23. In the motor controller 1 of the present embodiment, since the FF control unit 21 and the FB control unit 23 include the filters 31 and 32 for which the transmission characteristic F(s) can be set individually and independently, it is possible to more reduce vibrations in the ball screw 70 of the machine 60 with the filters 31 and 32 shared.

Specifically, the frequency $\omega$ in the transmission characteristic F(s) of the filter 31 in the FF control unit 21 is set near the resonant frequency $\omega_p$, and the frequency $\omega$ in the transmission characteristic F(s) of the filter 32 in the FB control unit 23 is set near the antiresonant frequency $\omega_0$. In this way, the FF control unit 21 includes the filter 31 which approximates the inverse characteristic of the transmission characteristic from the torque to the machine speed, and the FB control unit 23 includes the filter 32 which approximates the inverse characteristic of the transmission characteristic from the motor speed to the machine speed. In this way, it is possible to make the transmission characteristic from the speed command to the machine speed approach 1, and thus the speed command can be more considered to be a command for the machine speed. Hence, it is possible to more reduce vibrations in the ball screw (drive unit) 70 of the machine 60.

Although the embodiment of the present invention is described above, the present invention is not limited to the embodiment described above. The effects described in the present embodiment are simply a list of most preferred effects produced from the present invention, and the effects of the present invention are not limited to the effects described in the present embodiment.

For example, in the embodiment described above, the motor drive device which performs the speed control based on the speed command is illustrated. However, the feature of the present invention is not limited to this configuration, and the present invention can also be applied to motor drive devices for speed control in which position control based on a position command and the speed control based on the speed command are performed with separate motor drive devices.

In the embodiment described above, the motor controller which performs the speed control on the ball screw (drive unit) of the machine is illustrated. However, the feature of the present invention is not limited to this configuration, and the present invention can also be applied to a motor controller which performs speed control on the feed axis (drive unit) of a machine, a motor controller which performs speed control on a hydraulic pump, a belt conveyor (drive unit) or the like in an industrial machine and the like.

EXPLANATION OF REFERENCE NUMERALS 1 motor controller
10 speed command unit
20 speed control unit
21 FF control unit
22 FF controller
23 FB control unit
24 subtractor
25 PI controller
26 adder (addition unit)
31, 32 filter
40 encoder (speed detection unit)
50 servo motor
60 machine
70 ball screw (drive axis)
70A spring
70B dumper

What is claimed is:
1. A motor controller which controls a servo motor for driving a machine,
the motor controller comprising:
a speed command unit which issues a speed command for commanding a speed of the machine;
a speed detection unit which detects a speed of the servo motor; and
a speed control unit which produces a torque command based on the speed command issued by the speed command unit and a motor speed detected by the speed detection unit so as to control the speed of the servo motor,
wherein the speed control unit includes a filter which approximates an inverse characteristic of a transmission characteristic from the servo motor to the machine, the filter has a transmission characteristic:

$$F(s) = \frac{s^2 + 2\varsigma\omega s + \omega^2}{s^2 + \sqrt{2}\,\omega_{adj}s + \omega_{adj}^2},$$

wherein F(s) is based on a frequency $\omega$, a vibration damping coefficient $\zeta$ and a cutoff frequency $\omega_{adj}$ which are adjustment parameters and
the frequency $\omega$ is adjusted so as to be equal to or more than an antiresonant frequency $\omega_0$ of the machine but less than a resonant frequency $\omega_p$ of the machine.

2. The motor controller according to claim 1, wherein the speed control unit includes:
a feedforward control unit which produces a first torque command based on the speed command;
a feedback control unit which produces a second torque command based on a difference between the speed command and the motor speed; and
an addition unit which adds together the first torque command and the second torque command so as to produce the torque command, and
the feedforward control unit and the feedback control unit include the filters for which the transmission characteristic F(s) can the set individually and independently.

3. The motor controller according to claim 2, wherein the feedforward control unit includes the filter which approximates an inverse characteristic of a transmission characteristic from the torque command to a speed of the machine, and
the feedback control unit includes the filter which approximates an inverse characteristic of a transmission characteristic from the motor speed to the speed of the machine.

4. The motor controller according to claim 2, wherein the frequency $\omega$ in the transmission characteristic F(s) of the filter in the feedforward control unit can be adjusted in a range equal to or more than the frequency $\omega$ in the transmission characteristic F(s) of the filter in the feedback control unit.

* * * * *